United States Patent Office 3,174,929
Patented Mar. 23, 1965

3,174,929
METHOD OF REJUVENATING OIL AND GAS WELLS
Donald L. Andersen, Minneapolis, Minn., assignor to General Mills, Inc., a corporation of Delaware
No Drawing. Filed Aug. 17, 1960, Ser. No. 50,075
1 Claim. (Cl. 252—8.55)

The present invention relates to a novel method of rejuvenating oil and gas wells. More particularly, it relates to the rejuvenation of oil and gas wells by adding foaming agents to such wells.

It is well known in the petroleum industry that the accumulation of a liquid column of water and/or oil in the well shaft or bore hole of an oil or gas well may render unproductive an otherwise productive unit. The liquid column or liquid "plug," as it is referred to in the industry, may be petroliferous, aqueous, or a combination of both. Such liquid "plugs" may be formed in a variety of manners, such as, ground water leak-back, formation water build-up, crude oil accumulation, accumulation of petroleum condensate in gas condensate wells, or a combination of one or more of the above.

One method suggested for removing this liquid plug has been to add a foaming agent to the well to convert the liquid column to a lighter and more easily removed foam column. Although recognized as theoretically sound, this method has not met with wide-spread acceptance because of the lack of foaming agents which could be used in both oil and water or mixed oil and water phases.

It has now been discovered that the use of compounds of the formula:

$$RNH_m(A-COOX)_n$$

in which R is an aliphatic hydrocarbon group having 8 to 22 carbon atoms, A is a divalent hydrocarbon radical having 1 to 6 carbon atoms, X is a member selected from the group consisting of hydrogen, an alkali metal, or an amine, $n$ is an integer of 1 to 2, $m$ is an integer of 0 to 1 and the sum of $m$ and $n$ is 2, provides a novel, economic and effective method of rejuvenating liquid-plugged oil and gas wells.

The large amounts of liquids displaced in relatively short times clearly demonstrate the effectiveness of the tested compounds as foaming agents in a variety of solution conditions.

The foregoing examples are intended as illustrations of various preferred embodiments of the present invention and are not to be construed as limitations thereof.

The process of the present invention is highly useful in restoring productivity in liquid plugged oil and gas wells.

The embodiments of the invention in which an exclusive property or privilege is claimed are defined as follows:

A process for foaming two-phase liquid mixture having a liquid hydrocarbon phase and an aqueous phase containing 0 to 10% by weight, based on the total amount of water of an alkali metal chloride which comprises adding to said mixture a compound of the formula:

$$RNH_m(A-COOX)_n$$

where R is an aliphatic hydrocarbon group having 8 to 22 carbon atoms, A is a divalent hydrocarbon radical having 1 to 6 carbon atoms, X is a member selected from the group consisting of hydrogen, alkali metal, and amine, $n$ is an integer of 1 to 2 and $m$ is an integer of 0 to 1 and the sum of $m$ and $n$ is 2; passing a gas into said mixture; and forming a foam thereby.

Table I

| Example | System | Foaming Agent | Foamer In— | Conc. Active Foaming Agent, percent | Fluid Collected at 20 ml. min. | Total Time, min. | Total Fluid Collected, ml. |
|---|---|---|---|---|---|---|---|
| 1 | Water only | Triethanolamine salt of coco β-amino propionic acid | Water | 0.1 | 425 | 25 | 440 |
| 2 | Kerosene only | Zwitterion of coco β-aminopropionic acid | Kerosene | 0.1 / 0.5 | ------ / 450 | 16 / 30 | 410 / 480 |
| 3 | 490 kerosene, 100 water | Triethanolamine salt of coco β-amino propionic acid | Water | 0.5 | 300 | 38 | 400 |
| 4 | 250 kerosene, 250 water | ----do---- | ----do---- | 0.2 / 0.1 | 450 / 370 | 21 / ------ | 450 / ------ |
| 5 | 100 kerosene, 400 water | ----do---- | ----do---- | 0.1 | 390 | ------ | ------ |
| 6 | 490 kerosene, 10 water | Zwitterion of oleyl β-amino propionic acid | Kerosene | 0.5 | ------ | 20 | 340 |
| 7 | 400 kerosene, 100 5% NaCl | Triethanolamine salt of coco β-amino propionic acid | Water | 0.2 | 350 | 30 | 435 |
| 8 | 250 kerosene, 250 5% NaCl | ----do---- | ----do---- | 0.2 / 0.5 | 325 / ------ | ------ / 15 | ------ / 340 |
| 9 | 490 fuel oil, 10 water | Zwitterion of oleyl β-amino propionic acid | Fuel oil | 0.5 | ------ | 10 | 380 |

References Cited in the file of this patent

UNITED STATES PATENTS 2,168,116    Crites et al.    Aug. 1, 1939
2,619,467    Isbell    Nov. 25, 1952
2,926,108    Anderson    Feb. 23, 1960

OTHER REFERENCES

McCutcheon: Synthetic Detergents, article in Soap and Chemical Specialties, January 1958, page 50.

Dunning et al.: Foaming Agents Are Low Cost Treatment for Tired Gassers, article in the Oil and Gas Journal, vol. 57, No. 6, February 1959, pp. 108–110.

Dunning et al.: Foaming Agents: Cure for Water-Logged Gas Wells, article in the Petroleum Engineer, vol. 31, November 1959, pages B28 to B33.

UNITED STATES PATENT OFFICE
CERTIFICATE OF CORRECTION

Patent No. 3,174,929　　　　　　　　　　　　　　　March 23, 1965

Donald L. Andersen

It is hereby certified that error appears in the above numbered patent requiring correction and that the said Letters Patent should read as corrected below.

Column 1, line 64, after "and gas wells." insert the following:

The utilization of the method comprising the present invention is accompanied by several unexpected advantages. For example, the compounds contemplated for use in the present invention readily form foam in oil, water, or mixed oil-water phases. In addition, these compounds are not corrosive and in fact inhibit the corrosion of the metallic surfaces which they contact.

Representative of the compounds contemplated for use in the present invention are the acids such as the N-alkyl-β-aminopropionic acid, N-alkyl-β-aminocrotonic acid, N-alkyl-β-amino-bis-propionic acid, N-alkyl-β-amino-bis-crotonic acid; their zwitterion forms; and both alkali metal salts and amine salts of these acids.

The above-described detergent amino acids may be prepared by a variety of reactions. One such method comprises reacting a primary amine with a lower alkyl ester of an unsaturated acid and then hydrolyzing the ester to the corresponding acid, as described in detail in U. S. Letters Patent 2,468,012 issued to Arthur F. Isbel on April 19, 1949. Another method comprises simply reacting a primary amine with an unsaturated acid. Still further methods are known in the art. The alkali metal and amine salts of these acids may be readily formed by conventional methods.

The zwitterion form of the above-described detergent amino acids may be prepared by adding to an aqueous solution of their alkali metal salts a non-oxidizing mineral acid in the manner described in detail in U. S. Letters Patent 2,816,920 issued to Donald L. Andersen on December 17, 1957.

While single isolated alkylamines may be used with excellent results in preparing these detergent amino acids by the above-described and other reactions, the mixture of amines obtained by the amination of mixed fatty acids or selected fractions thereof present in common fats and oils are preferred because of their availability. Typical of such amines are "coco" amine which contains fatty groups of from 8 to 18 carbon atoms and "tallow" amine which contains fatty groups of from 8 to 22 carbon atoms and which are obtained by the amination of the fatty acids or fractions thereof found in coconut oil and tallow, respectively.

The amount of foaming agent to be added to any given oil or gas and oil are best determined by on-the-spot testing procedures. Generally we find, however, that the addition of .1% to 2% as based on the calculated weight of the liquid present is adequate for most rejuvenation processes. On some occasions it may be desirable to use higher amounts which may be done without particular disadvantage because the novel compounds used in the present invention are noncorosive.

In the preferred practice of the present invention the unique foaming agents are introduced into the oil or gas well bore in the form of a water or kerosene solution and agitated by use of air or liquid pressure. In a relatively short period of time the foaming action is sufficient to lighten the weight of the liquid column and result in a once more productive well.

The present invention is further illustrated by reference to the following examples. Unless otherwise indicated all parts and percentages used herein are by weight.

Example 1 - 9

The effectiveness of various foaming agents in the rejuvenation of oil and gas wells is best determined by a simple laboratory test of simulated well conditions. A 500 ml. column of test liquid containing the appropriate foaming agent to be tested was poured into a vertical glass tube having a fritted glass disc near the bottom of the tube which retains the column of liquid and through which gas may be passed. Mounted in the vertical tube 122 cm. above the fritted glass disc is a 10 mm. OD glass tubing overflow. The top of the vertical tube is sealed. Dry nitrogen is passed into the tube through the fritted disc at the rate of 300 cc/min. The gas flowing through the liquid causes a foam to form which leaves the vessel through the overflow. The amount of liquid displaced as foam versus time is recorded as a measure of the effectiveness of the foaming agent.

In testing two phase systems, an initial high gas flow is maintained in order to obtain mixing of the phases. When the phases are sufficiently mixed, the gas flow is reduced to 300 ml/min. and timing begun. The results of testing preferred foaming agents under a variety of conditions are shown in Table I.

Signed and sealed this 17th day of August 1965.

(SEAL)
Attest:

ERNEST W. SWIDER
Attesting Officer

EDWARD J. BRENNER
Commissioner of Patents